June 27, 1972  F. W. SCHNEBLE, JR., ET AL  3,672,986
METALLIZATION OF INSULATING SUBSTRATES
Original Filed June 28, 1966  15 Sheets-Sheet 1

INVENTORS
FREDERICK W. SCHNEBLE, JR.
JOHN F. McCORMACK
RUDOLPH J. ZEBLISKY
JOHN DUFF WILLIAMSON
JOSEPH POLICHETTE
BY
MORGAN, FINNEGAN, DURHAM & PINE
ATTORNEYS

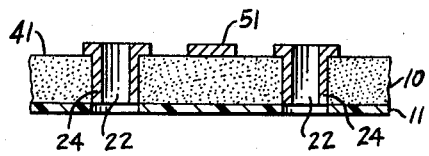
FIG.-11A
FIG.-12B
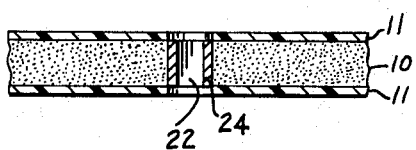
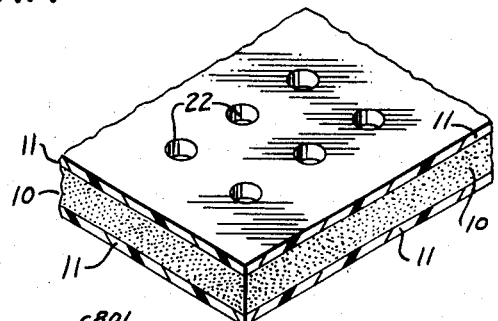
FIG.-12C
FIG.-14B
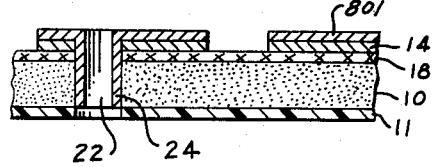
FIG.-15B
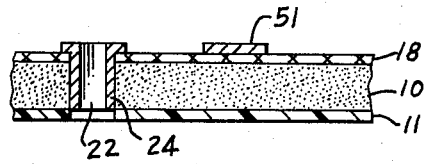
FIG.-16B
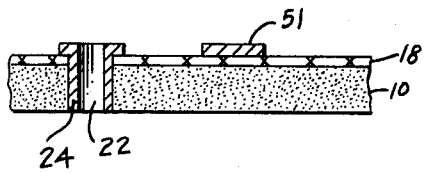
FIG.-17B
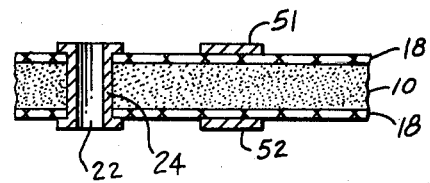
INVENTORS.
FREDERICK W. SCHNEBLE, JR.
JOHN F. McCORMACK
RUDOLPH J. ZEBLISKY
JOHN DUFF WILLIAMSON
JOSEPH POLICHETTE
BY
MORGAN, FINNEGAN, DURHAM & PINE
ATTORNEYS

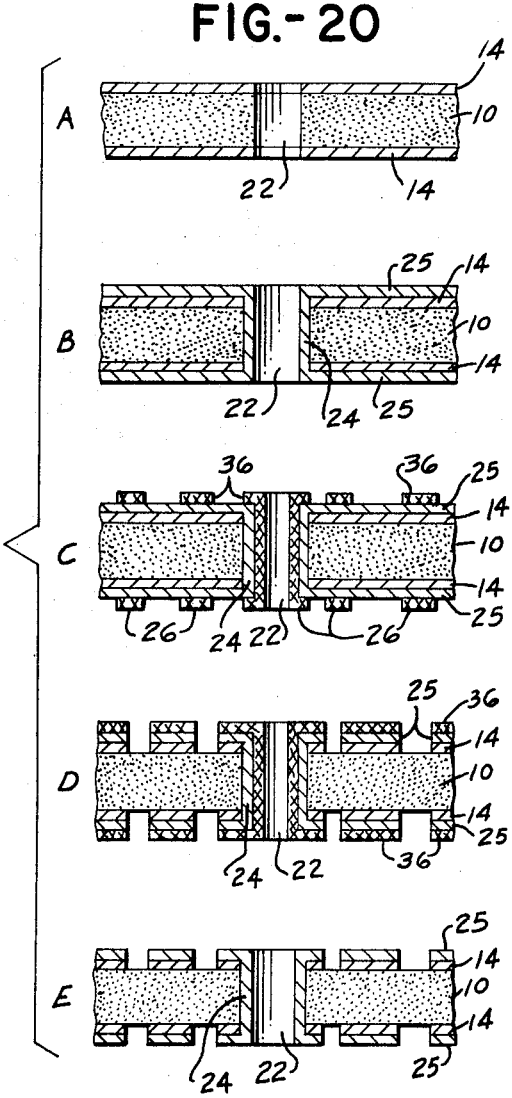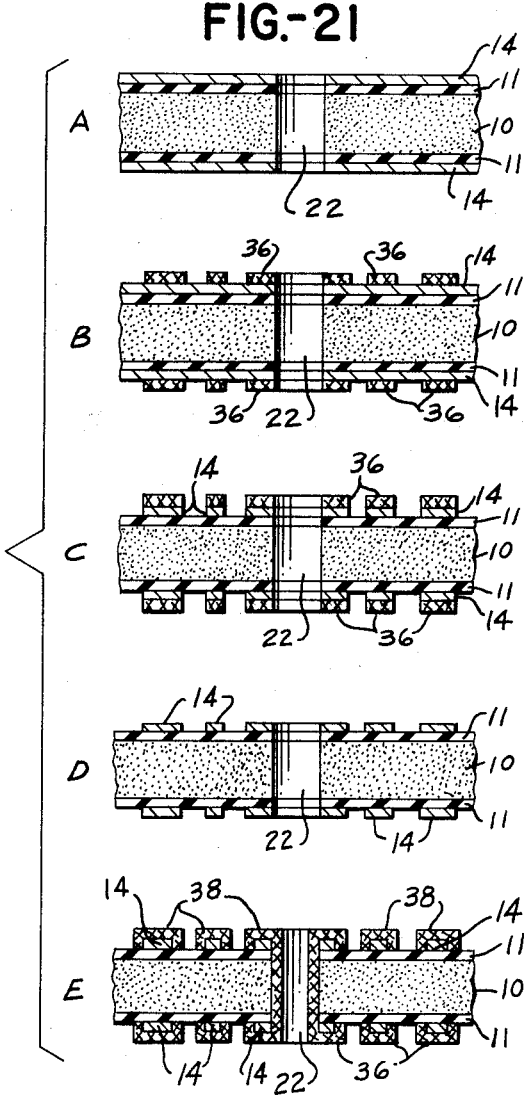

June 27, 1972  F. W. SCHNEBLE, JR., ET AL  3,672,986
METALLIZATION OF INSULATING SUBSTRATES
Original Filed June 28, 1966  15 Sheets-Sheet 10

INVENTORS.
FREDERICK W. SCHNEBLE, JR.
JOHN F. McCORMACK
RUDOLPH J. ZEBLISKY
JOHN DUFF WILLIAMSON
JOSEPH POLICHETTE
BY
MORGAN, FINNEGAN, DURHAM & PINE
ATTORNEYS

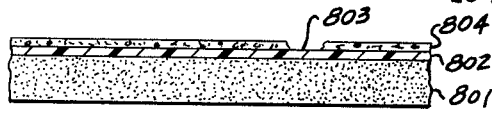
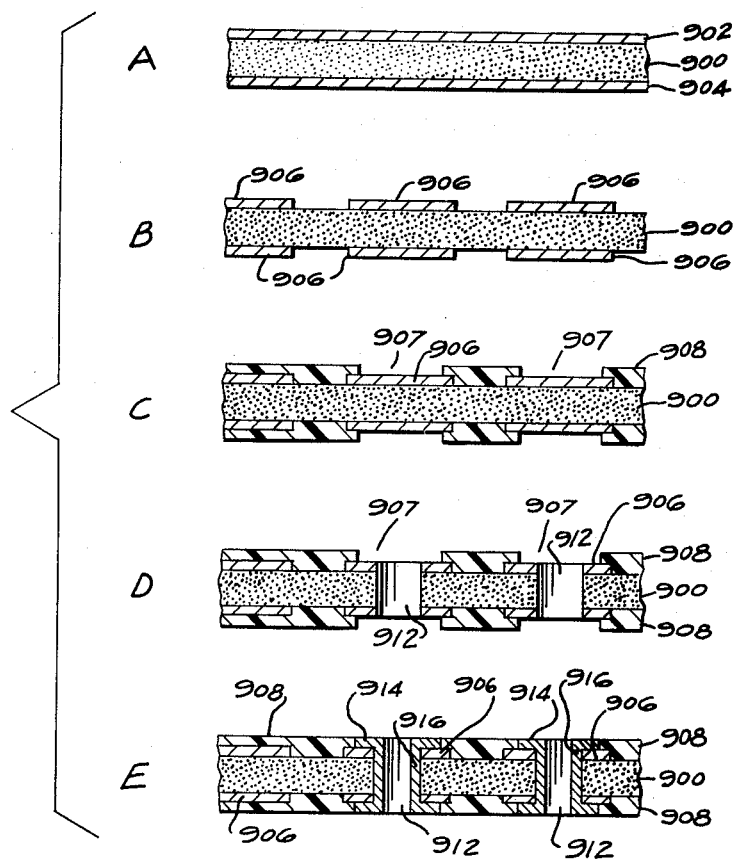
FIG.-28
FIG.-29

United States Patent Office 3,672,986
Patented June 27, 1972

3,672,986
METALLIZATION OF INSULATING SUBSTRATES
Frederick W. Schneble, Jr., Oyster Bay, John F. Mc-
Cormack, Roslyn Heights, Rudolph J. Zeblisky, Haup-
pague, John Duff Williamson, Miller Place, and Joseph
Polichette, Farmingdale, N.Y., assignors to Day Com-
pany, N.V., Netherlands Antilles
Continuation of application Ser. No. 561,123, June 28,
1966. This application Dec. 19, 1969, Ser. No. 882,782
Int. Cl. H05k 3/06
U.S. Cl. 117—212
8 Claims

ABSTRACT OF THE DISCLOSURE

A blank for the production of metallized articles is provided, which comprises an insulating base which is catalytic throughout its interior to the reception of electroless metal, and a surface on said base having super-imposed thereon and adhered thereto a unitary thin film of metal. In addition, methods for metallizing plastics and forming plated through hole printed circuit boards are also provided.

This application is a continuation of application Ser. No. 561,123, filed June 28, 1966. This application-in-part discloses subject matter contained in one or more of the following applications:

Ser. No. 218,656, filed Aug. 22, 1962, now U.S. Pat. No. 3,259,559 which in turn discloses subject matter contained in co-pending application Ser. No. 785,703, filed Jan. 8, 1959 and now abandoned;

Serial No. 33,361, filed May 31, 1960, now U.S. Pat. No. 3,146,125, which in turn discloses subject matter contained in Ser. No. 831,407, filed Aug. 3, 1959, and now abandoned; and Serial No. 26,401, filed May 3, 1960 and now U.S. Pat. No. 3,095,309.

This invention relates to materials and techniques for metallizing insulating substrates generally and for the manufacture of printed circuits particularly.

It is an object of the present invention to provide new and improved insulating blanks which are catalytic to the reception of electroless metal and which can be metallized directly, thereby obviating the necessity for seeding and/or sensitizing.

Another object of this invention is to make rugged and durable metallized objects from such catalytic insulating blanks.

A further object of this invention is to make printed circuit boards from such blanks, including one-layer, two-layer and multi-layer boards.

A further object of this invention is to make from such blanks printed circuit boards, including one-layer, two-layer and multi-layer boards, which are provided with conductive passageways.

Heretofore, in the manufacture of printed circuit boards comprising conductive passageways or holes through insulating panels, it has been customary to seed and sensitize the lateral walls surrounding the passageways or holes by contacting a perforated substratum sequentially with aqueous acidic solutions of stannous tin ions and precious metal ions, e.g., palladium, or with a single acidic aqueous solution comprising a mixture of stannous tin ions and precious metal ions, such as palladium ions. For example, one such treatment involves immersing the perforated insulating base material first in an acidic aqueous solution of stannous chloride followed by washing, after which the substratum is immersed in an acidic aqueous solution of palladium chloride. In an alternate system, the perforated substratum is simply immersed in a one-step seeder-sensitizer acidic aqueous solution comprising a mixture of stannous chloride and palladium chloride.

Such aqueous acidic seeding and sensitizing solutions have important limitations. Thus, the bond formed between the electroless metal deposit and the surface sensitized with such systems tends to be quite weak and generally unacceptable for many products such as printed circuits, where a strong bond and relatively thick electroless metal deposits are desired. Further, hydrophobic plastics cannot be readily wetted with such solutions and therefore the sensitization achieved with such materials is ordinarily less than satisfactory. An additional disadvantage of such seeding and sensitizing systems is that their use leads to poor and generally unacceptable bonds between the elecrtoless metal and the insulating substrate. When such aqueous seeding and sensitizing solutions are utilized to sensitize lateral walls of the holes or passageways in panels provided with metal foil on one or more surfaces of the panel, the problem of poor bonding between the electroless metal and sensitized areas becomes more acute in the event that an additional layer of metal is to be superimposed on the original metal foil. This is so because such sensitization of the type described occurs on the exposed metal foil and interferes with the bond between the subsequent metal layer and the initial metal layer. In the manufacture of printed circuits, it is frequently necessary to superimpose additional metal on the foil adhered directly to the substratum for a variety of reasons. Thus, the initial foil may not be thick enough for the desired printed circuit component and additional metal may therefore have to be added to thicken the pattern. Alternatively, it is frequently necessary to superimpose on the metal cladding a layer of a different metal in order to impart special characteristics to the circuit. Typically, metals such as nickel, gold, silver and rhodium, including mixtures of such metals, are electroplated or electrolessly deposited on an initial layer of copper foil or cladding during the manufacture of printed circuits from copper clad laminates. When the aqueous seeding and sensitizing solutions of the type described are utilized in the manufacture of such circuits, the bond between the copper and the metal subsequently superimposed on the copper tends to be weak.

As will be clear from the following description, use of the catalytic blanks and compositions of the present invention eliminates the need for such conventional seeding and/or sensitizing solutions and therefore eliminates the problems concomitant with the use thereof. Also important is the fact that use of these catalytic blanks and compositions leads to the achievement of uniformly high bond strengths between the insulating substratum and the electroless metal deposit, a result not possible with the conventional aqueous seeding and sensitizing systems of the prior art.

Other objects and advantages of the invention will be set forth in part herein and in part will be obvious herefrom or may be learned by practice with the invention, the same being realized and attained by means of the instrumentalities and combinations pointed out in the appended claims.

The invention consists in the novel parts, constructions, arrangements, combinations and improvements herein shown and described. The accompanying drawings referred to herein and constituting a part hereof, illustrate certain embodiments of the invention and together with the specification serve to explain the principles of the invention.

Figure 1:
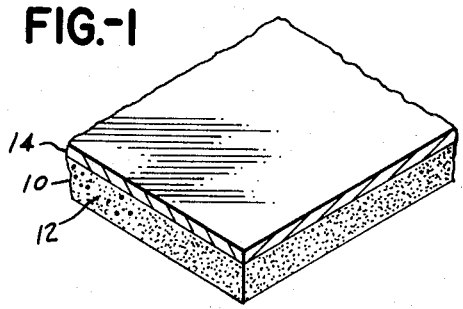
FIGS. 1 and 2 are three-dimensional views of certain embodiments of the blanks of this invention.
Figure 2:
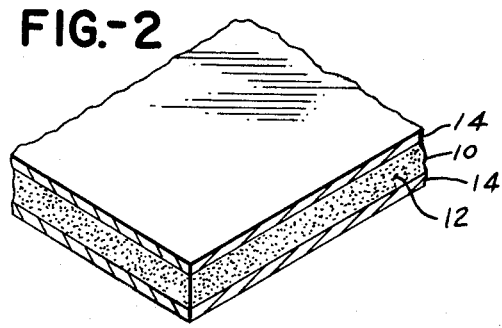
Figure 3:
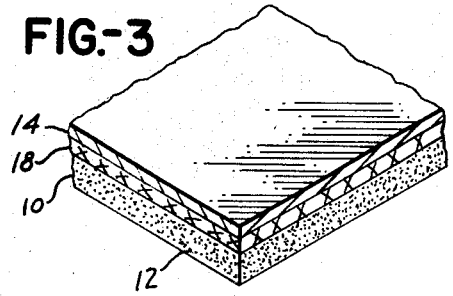
FIGS. 3 and 4 are cross-sectional views of further embodiments of the catalytic blanks of this invention.
Figure 4:
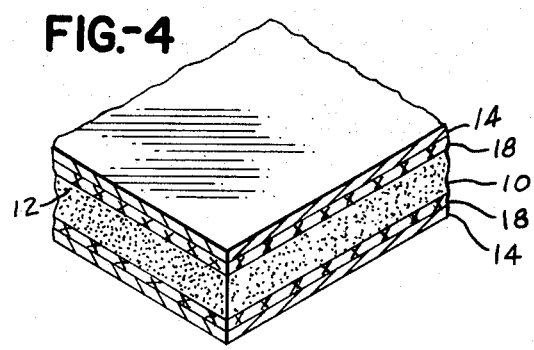
Figure 6:
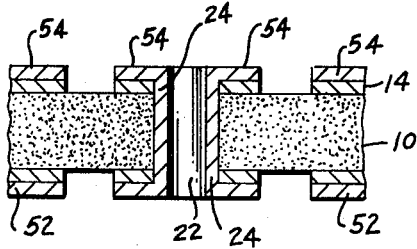
Figure 7:
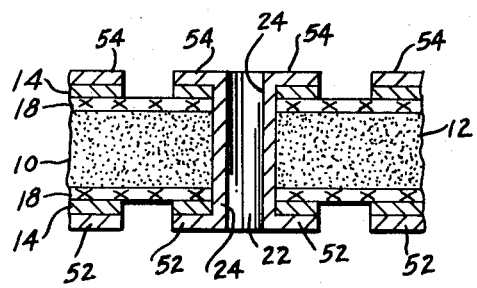
Figure 8:
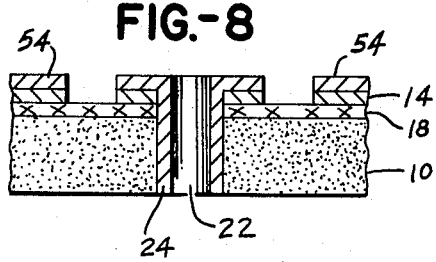
Figure 5:
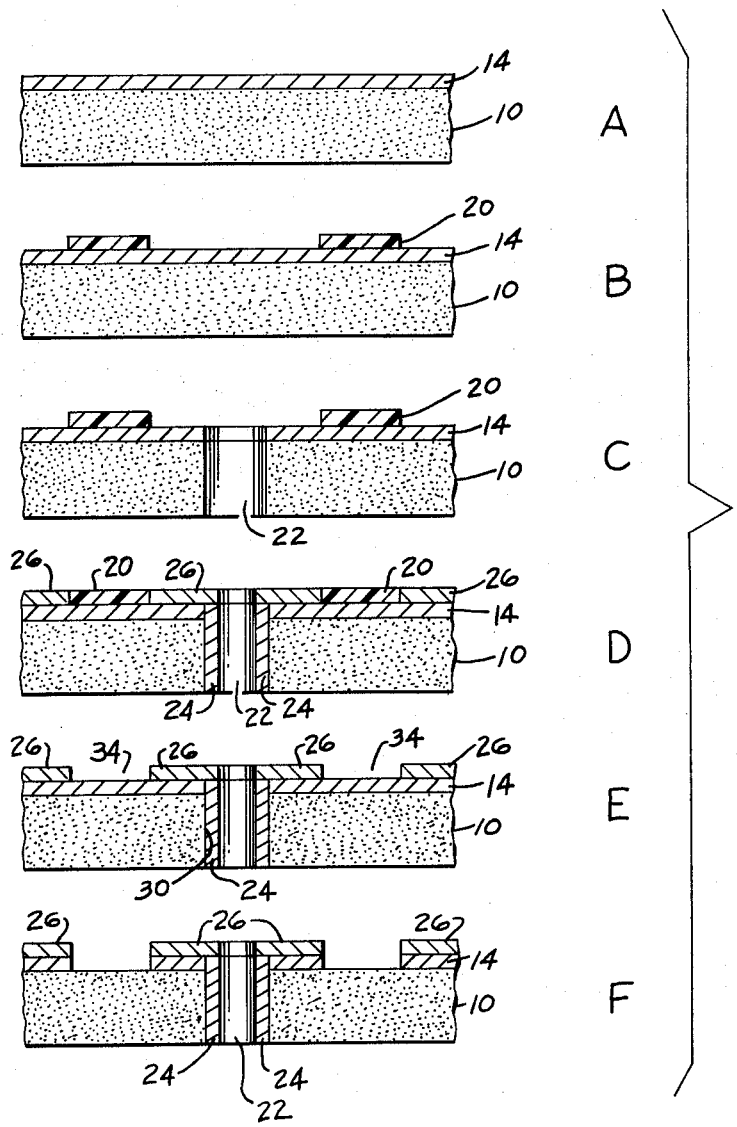
Figure 9:
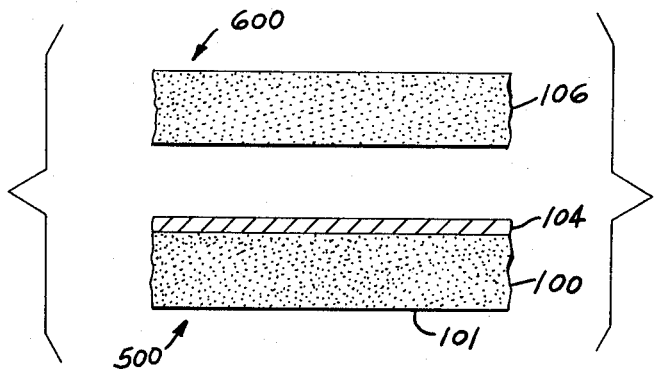
Figure 10:
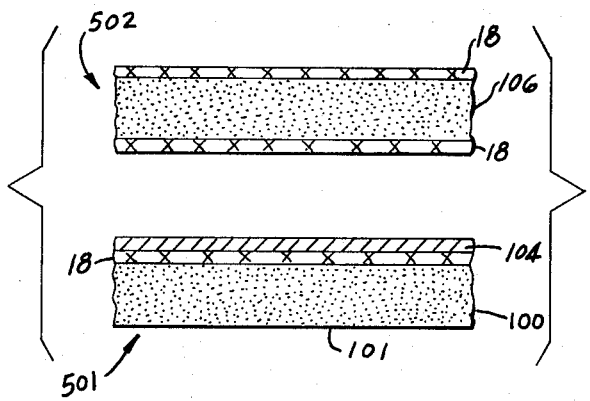

FIG. 5, A–F, is a schematic illustration of the steps utilized in making a one-sided printed circuit board from the blank of FIG. 1;

FIGS. 6 and 7 are cross-sectional views of typical embodiments of two-sided plated through hole printed circuit boards produced in accordance with this invention utilizing the blanks of FIGS. 2 and 4, respectively;

FIG. 8 is a cross-sectional view of a one-sided plated through hole circuit board manufactured from the blank of FIG. 3;

FIGS. 9 and 10 are cross-sectional views representing the manner in which the blanks of this invention may be combined to form multi-layer printed circuit boards;

FIGS. 9A, 9B, 10A and 10B are cross-sectional views of multi-layer plated through hole printed circuit boards produced by combining blanks as illustrated in FIGS. 9 and 10;

FIGS. 11–17 and 28 are cross-sectional views of additional catalytic blanks produced in accordance with this invention;

FIGS. 11A, 12B, 12C, 14B, 15B, 16B and 17B are cross-sectional views of various articles produced from the blanks of the present invention; and FIGS. 18–27 illustrate procedures which can be used to produce printed circuit boards from the blanks of this invention.

In the drawings, similar reference numerals are used to represent similar parts.

In FIG. 1 is shown a blank which comprise, in its simplest form, an insulating base 10 having distributed therein an agent 12 which is catalytic to the reception of electroless metal from an electroless metal deposition solution. Hereinafter whenever the term "catalytic" is employed it will refer to a material which has its propery, i.e., the ability to receive a metal deposit when exposed to an electroless metal deposition solution, or to catalyze the deposition of metal from such a solution. The catalytic agent 12 may be dissolved in or dispersed throughout the base 10. Alternatively, the insulating base material itself may be catalytic to the reception of electroless metal, e.g., the insulating base material may be formed in whole or in part of an insulating organo-metallic compound which is catalytic to the reception of electroless metal. Superimposed on the base 10 and adhered thereto is a thin unitary and integral metal film or laminate 14 which preferably covers and is substantially conterminous with, i.e., has the same boundaries as, the surface of base 10. The thickness of the metal film 14 will depend primarily upon the manner in which it is fabricated and bonded to the base 10, and will also depend upon the ultimate use to which the blank is to be put. Typically, the metal film will have a thickness of between about 0.05 micron and 105 microns. In a preferred embodiment, the metal film 14 is copper. The thickness of the metal film 14 when made of copper will preferably be such that its weight will vary between about 0.03 and 2 ounces per square foot.

When the metal film 14 is superimposed on the base 10 by means of conventional metal cladding techniques, i.e., by preforming a thin foil of metal, e.g., by electrolytic deposition, and laminating it to the base, the foil 14 will have a thickness of at least about 17 microns. On the other hand, if the metal film is produced by vapor deposition or by the electroless chemical metal deposition technique described herein, it can be as thin as 0.05 micron.

In accordance with a preferred embodiment of the present invention, the film 14 is produced by electroless metal deposition, preferably electroless copper deposition, and has a thickness of between about 0.05 and 30 microns, preferably between about 0.1 and 10 microns. Thin films of the type disclosed having a thickness of less than 5 microns and preferably between 2 and 4 microns, have the ability to be quick etched, as described hereinbelow.

In FIG. 2, there is shown an embodiment of the blank which comprises an insulating member 10 containing a catalytic agent 12. Adhered to both surfaces of the base are thin unitary metal films 14.

FIGS. 3 and 4 illustrate modified embodiments of the blank shown in FIGS. 1 and 2. Thus, in FIG. 3 the catalytic base 10 has superimposed thereon an insulating adhesive resin 18 which is itself catalytic to the reception of electroless metal. The adhesive resin 18 has dissolved therein or dispersed therein a catalytic agent. Alternatively, the adhesive resin 18 may be formed in whole or in part of an insulating organo-metallic compound which is itself catalytic to the reception of electroless metal. The thin layer of metal 14 is adhered to the base 10 by the catalytic adhesive 18.

Similarly, in FIG. 4, the catalytic base 10 is coated on both surfaces with an adhesive 18, which is catalytic, and thin metal films 14 are adhered to both surfaces of base 10 by the adhesive 18.

When certain forms of catalytic agent, e.g., solid particles, are used to prepare the catalytic base 10, there is a tendency for the surface layers of the base 10 to be rich in resin and low in catalyst. As a result, depending upon how the base 10 is manufactured, it sometimes happens that the surface of the base is non-catalytic, even though the interior of base 10 is highly catalytic. This situation is remedied by coating one or both surfaces of the base 10 with a catalytic adhesive 18, as shown in FIGS. 3 and 4. Alternatively, such surfaces could be rendered catalytically active by treatment with acids. Especially suitable are oxidizing acids such as sulfuric, nitric and chromic acids, including mixtures of the foregoing. Treatment with such acids not only renders the surface catalytically active, but it also frequently serves to considerably enhance the bond between the surface and electroless metal deposited thereon.

FIG. 5 illustrates the steps to be used in the manufacture of a one-sided plated through hole board from the blank shown in FIG. 1.

FIG. 5A illustrates the starting blank comprising a catalytic base 10 having a thin metal film 14 adhered to the upper surface. The thin metal film may but need not be conterminous with the upper surface.

In FIG. 5B, a negative resin mask 20 has been printed onto the metal foil 14 to leave exposed a positive pattern of the desired printed circuit. At C, FIG. 5, a hole 22 has been provided as by punching or drilling through the foil 14 and base 10, at an interconnecting point of the desired circuit. The blank as it appears in FIG. 5C is then immersed in an electroless metal plating bath of the type described herein to deposit metal 26 on the wall 30 of hole 22. Additional metal 26 deposits on the surface of the metal film 14 which is not covered by the mask 20. If desired, an electrode may be attached to the board after the wall 24 has been formed by electroless deposition, and the circuit pattern and hole walls built up by conventional electrolytic deposition of metal. Following build-up of the circuit to desired thickness either by electroless or electrolytic deposition, the blank is treated with a suitable solvent to remove the mask 20. The blank, following removal of the mask 20, is depicted in FIG. 5E. Finally, the panel is subjected to an etching solution, e.g., ferric chloride, ammonium persulfate, and the like, when the metal film 14 is copper, to thereby remove the thin film of copper 34 which was initially covered by the mask 20. Note that if the metal film 14 is thin, e.g., less than 5 microns, there will be no need to mask the circuit pattern 26 or the plating 24 on the hole walls 30 during the etching step, because the film of metal 14 is so extremely thin compared with the circuit pattern 26 that it will be removed before any substantial etching of circuit 26 or plated wall 24 occurs. Of course, if the initial metal film 14 is thick, the circuit 26 and wall 30 will have to be masked prior to the etching operation.

The etching operation may be carried out by either blasting the surface of the panel with a fine spray of etchant solution or by immersing the panels, which are held in a rack on a conveyor, in an agitated tank of etchant. During etching, the concentration of the etching solution and the time of contact will be controlled to insure complete removal of thin layer of copper foil in the areas 34. After etching, the panel should be water rinsed to remove all etching chemicals to thereby prevent contamination of the surface or edges of the panels. If desired, the circuit pattern may be plated with additional metals, such as silver, nickel, rhodium, gold or similar high wear resistant materials for special applications. When it is necessary to solder lugs or other hardware to the pattern, it is advisable to solder plate the conductive pattern.

The procedure described above and illustrated in FIG. 5 may also be used to prepare a two-sided, plated through hole printed circuit board of the type shown in FIG. 6, starting with a blank of the type shown in FIG. 2. As shown in FIG. 6, the circuit board comprises a catalytic base 10 having circuit patterns 52 and 54 superimposed on the lower and upper surfaces, respectively. Through connections between the circuit patterns is provided by hole 22, the lateral wall of which is coated with metal 24.

The one-sided plated through hole board of FIG. 8 is prepared by applying the technique illustrated in FIG. 5 and described above to the blank of FIG. 3.

Likewise, the two-sided plated through hole board shown in FIG. 7 is prepared by applying the procedure of FIG. 5 to the blank shown in FIG. 4. In FIG. 7, circuits 52 and 54 on the lower and upper surfaces, respectively, of catalytic base 10 are connected via plated through hole 22, the lateral walls of which are coated with electroless metal 24.

Figure 9A:
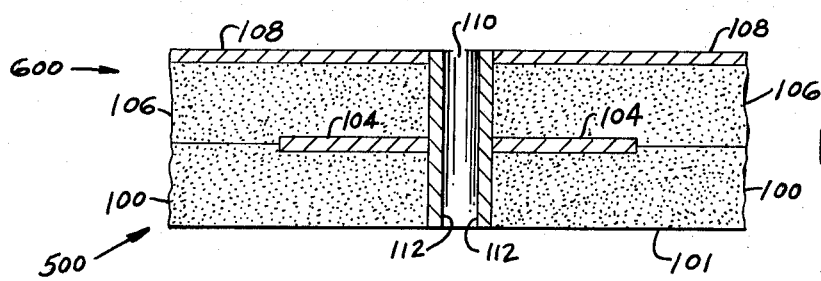
Figure 9B:
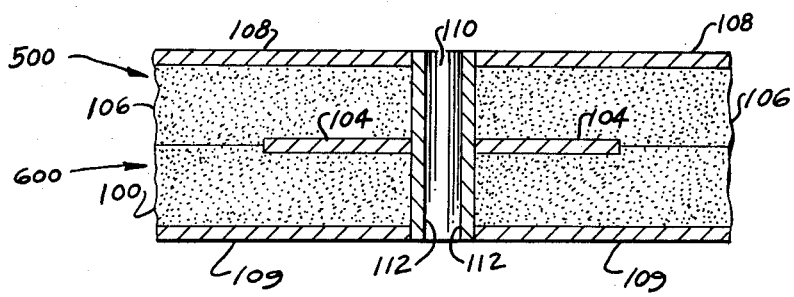

Procedures for producing multi-layer circuit boards from the blanks of the present invention are shown in FIGS. 9, 9A and 9B. In FIG. 9 is shown an embodiment of the invention wherein a blank 500 which consists of a catalytic insulating base 100 having a printed circuit pattern 104 on one surface is laminated to a blank 600 which consists solely of a catalytic resin base 106. Following lamination a circuit pattern 108 (FIG. 9A) may be formed directly on the surface of catalytic base 106 by printing a negative pattern of the circuit with a noncatalytic resinous mask and then subjecting the entire board to electroless metal deposition. If desired, holes 110 could be provided at interconnecting points of the circuit prior to subjecting the laminated structure to electroless deposition, to thereby simultaneous build up a pattern on the surface of catalytic base 106 and plate the lateral walls 112 of the holes 110. The resulting circuit board would look like that shown in FIG. 9A. A circuit pattern 109 could also be formed on the lower surface 101 of catalytic base 100 simultaneously with the circuit pattern 108, to form a board having the appearance of that shown in FIG. 9B.

Figure 10A:
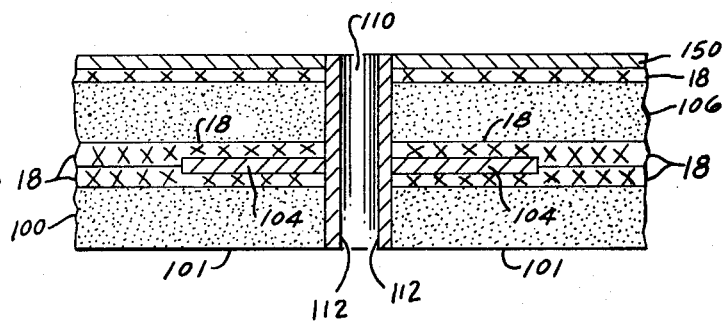
Figure 10B:
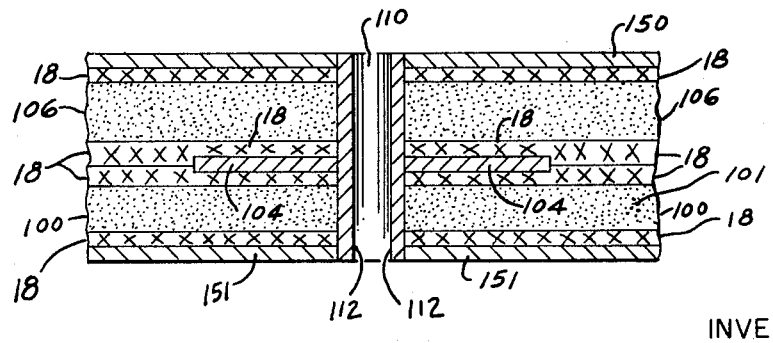

As has been brought out above, it frequently happens that the catalytic bases described herein comprise resin rich surfaces which are either non-catalytic or poorly catalytic to the reception of electroless metal. To remedy this situation, the multi-layer boards shown in FIGS. 10A and 10B are prepared from the components shown in FIG. 10. Starting with a blank 501 of the type shown in FIG. 10, a circuit pattern 104 is formed by a print and etch technique on the catalytic adhesive 18 which is itself bonded to a catalytic base 100. Next, a blank 502 comprising a catalytic base 106 coated on both surfaces with catalytic adhesive layers 18 is superimposed on the circuit pattern 104. A desirable circuit pattern 150 (FIG. 10A) is then formed on the outer layer of the catalytic adhesive 18 using the additive electroless metal deposition technique described hereinabove in connection with FIGS. 9, 9A and 9B. Here again, holes 110 defining cross-over connections could be provided in the laminated structure prior to subjecting the laminate to electroless metal deposition to simultaneously build up a circuit pattern 150 on catalytic ink 18 and to plate the walls 112 of the holes. A typical example of a resulting multi-layer circuit board formed in this way is shown in FIG. 10A. As will be seen from FIG. 10A, printed circuit patterns 104 and 150 are adhered to catalytic base members 100 and 106, respectively, by catalytic adhesive 18. The entire assembly is also held together with catalytic adhesive resin ink 18. Holes 110 plated with metal 112 provide through connections between circuits 150 and 104. It will be appreciated that the use of the catalytic ink layers 18 in the multi-layer embodiment of FIGS. 10 and 10A insures against a discontinuity in the lateral wall 112 of the plated through hole 110 adjacent the point at which the separate layers of the circuit are joined to their respective bases. If desired, a circuit pattern 151 could also be formed on the surface 101 of catalytic base 100 simultaneously with the circuit pattern 150 to form a multi-layer board having the appearance of that shown in FIG. 10B. In this embodiment, an additional layer of catalytic ink 18 will preferably be used to coat surface 101 prior to producing the circuit 151 by the additive electroless metal deposition technique described hereinabove.

It should be appreciated that in multi-layer embodiments of the type shown in FIGS. 9A, 9B, 10A and 10B, all circuit patterns could be formed by the additive technique described herein. Similar, as already brought out, all circuit patterns of such embodiments could be formed by the print and etch technique.

Additional catalytic blanks for use in making printed circuits of the type described are shown in FIGS. 11–17.

It is sometimes desirable in single-sided, double-sided and multi-layer boards, to have one surface of the finished board completely non-catalytic. Blanks suitable for making such boards are shown in FIGS. 11–15.

Figure 11:
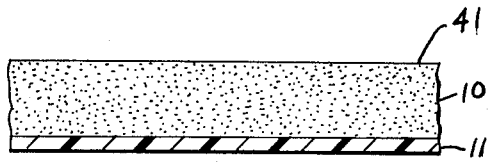
Figure 12:
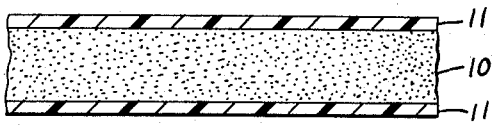

Thus, in FIG. 11 there is shown a blank which consists of a catalytic insulating base 10 which has a non-catalytic insulating surface 11 either bonded thereto or integral therewith. The non-catalytic insulating surface 11 will ordinarily be conterminous with the adjacent surface of the base 10. In FIG. 12 is shown a blank which comprises a catalytic insulating base 10 having non-catalytic insulating surfaces 11 either bonded to or integral with both surfaces of the base 10. Here again, non-catalytic insulating surfaces 11 will ordinarily be conterminous with the adjacent surfaces of base 10.

Figure 13:
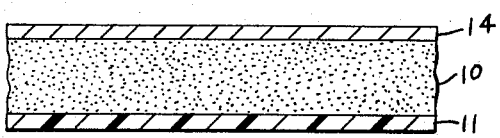

In FIG. 13 is shown a blank comprising a catalytic insulating base 10 comprising a conterminous lower non-catalytic insulating surface 11. Adhered to the upper surface and preferably conterminous therewith is a thin film of metal 14.

Figure 14:
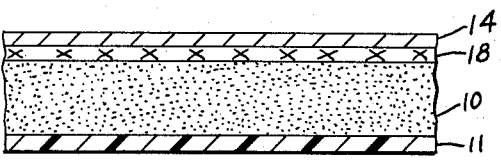

In FIG. 14 is shown a blank useful for the manufacture of printed circuit components which comprises a catalytic insulating base 10 having one non-catalytic insulating surface 11 conterminous therewith. The opposite surface of the catalytic base member 10 comprises a catalytic insulating adhesive layer 18 on which is superimposed a thin metal film 14.

Figure 15:
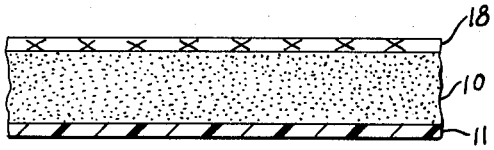

In FIG. 15 is shown still another embodiment of the blank of this invention which comprises a catalytic insulating base 10 having one insulating surface 11 which is non-catalytic and a second insulating surface 18 which comprises an insulating catalytic adhesive of the type described herein.

Figure 16:
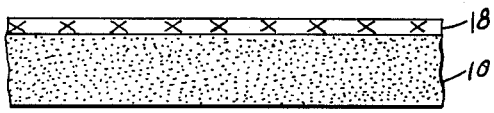
Figure 17:
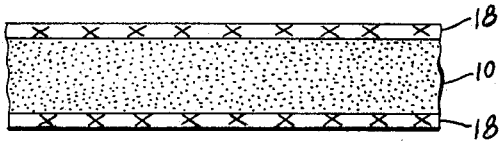

Additional blanks which are suitable for use in the preparation of printed circuits or generally in the metallization of plastic substrates are shown in FIGS. 16 and 17. In FIG. 16, there is shown a blank which comprises an insulating catalytic base 10 having one surface which comprises a catalytic insulating adhesive 18.

In FIG. 17, there is shown another blank which comprises a catalytic insulating base 10, both surfaces of which comprise a catalytic insulating adhesive 18. The blanks of FIGS. 16 and 17 are particularly useful in forming the multilayer boards shown in FIG. 10.

Preferably, in those embodiments of the invention calling for a catalytic adhesive 18, the adhesive will take the form of a flexible adhesive resin of the type described hereinbelow. The flexible adhesive resins which are catalytic to the reception of electroless metal and are also insulating in nature, insure a strong reliable bond between the circuit pattern and the catalytic insulating base.

As will be appreciated from the foregoing, all of the blanks described herein may be used to form metallized insulating substrates directly on insulating base materials without the necessity of seeding the insulating material prior to metallization.

A distinct advantage of these blanks in printed circuit manufacture is that they can be used to produce directly rugged and reliable printed circuit boards having plated through holes. Use of such blanks eliminates the preseeding and/or pre-sensitizing steps of conventional practice together with the concomitant problems associated with such practice.

Catalytic insultaing bases containing non-catalytic surfaces may be made in a variety of ways. Thus, the catalytic insulating base could be made with a minimal amount of catalytic agent to insure that the surface of the base is extremely rich in insulating and extremely poor in catalyst. When formed, such a base, or laminates impregnated with such a base, will have surfaces which are substantially non-catalytic to the deposition of electroless metal.

Alternatively, a catalytic insulating base rich in catalyst could be prepared and one or both surfaces thereon then coated with a non-catalytic insulating film or adhesive. For example, when the catalytic base is made by impregnating paper or fibrous substrata, e.g., Fiberglas, with catalytic resin, a final gel coat of non-catalytic resin could be superimposed on the laminated structure during manufacture to produce the non-catalytic surface. Alternatively, a film of non-catalytic resin could be bonded to the substrata following completion of lamination.

In the manufacture of the catalytic base materials and adhesives described, an agent which is catalytic to the reception of electroless metal is distributed throughout an insulating base or adhesive, as by dissolution, dispersion, or by reacting a part or all of the material of the base or adhesive with a catalytic agent so as to form a chemical compound or complex, which is itself catalytic to the reception of electroless metal. The resulting base or adhesive will be catalytic to the reception of electroless metal throughout its interior.

Exposed surfaces of the catalytic base materials of this invention are catalytic to the reception of electroless metal, or may be rendered catalytic by subjecting the surface to relatively mild mechanical or chemical abrasion or etching or by coating the surface with catalytic adhesives of the type described.

A film of metal as shown in FIGS. 1–4, accordingly, may be readily superimposed on such a base simply by immersing the base in an electroless metal deposition solution of the type to be described. Alternatively, the catalytic base could actually be clad with a thin metal foil, using typical metal cladding or lamination techniques, e.g., by bonding a thin foil of metal to the base.

Alternative procedures for making multi-layer printed circuits from a metal clad insulating catalytic base by the so-called print and etch technique are shown schematically in FIGS. 18–27. These embodiments are suitable for use with blanks in which a thick metal foil is clad to a catalytic base. Preferably, however, the techniques of these figures will be practiced with a catalytic base material clad with a thin metal foil, e.g., less than 30 microns, and preferably less than 5 microns, in thickness.

Figure 18:
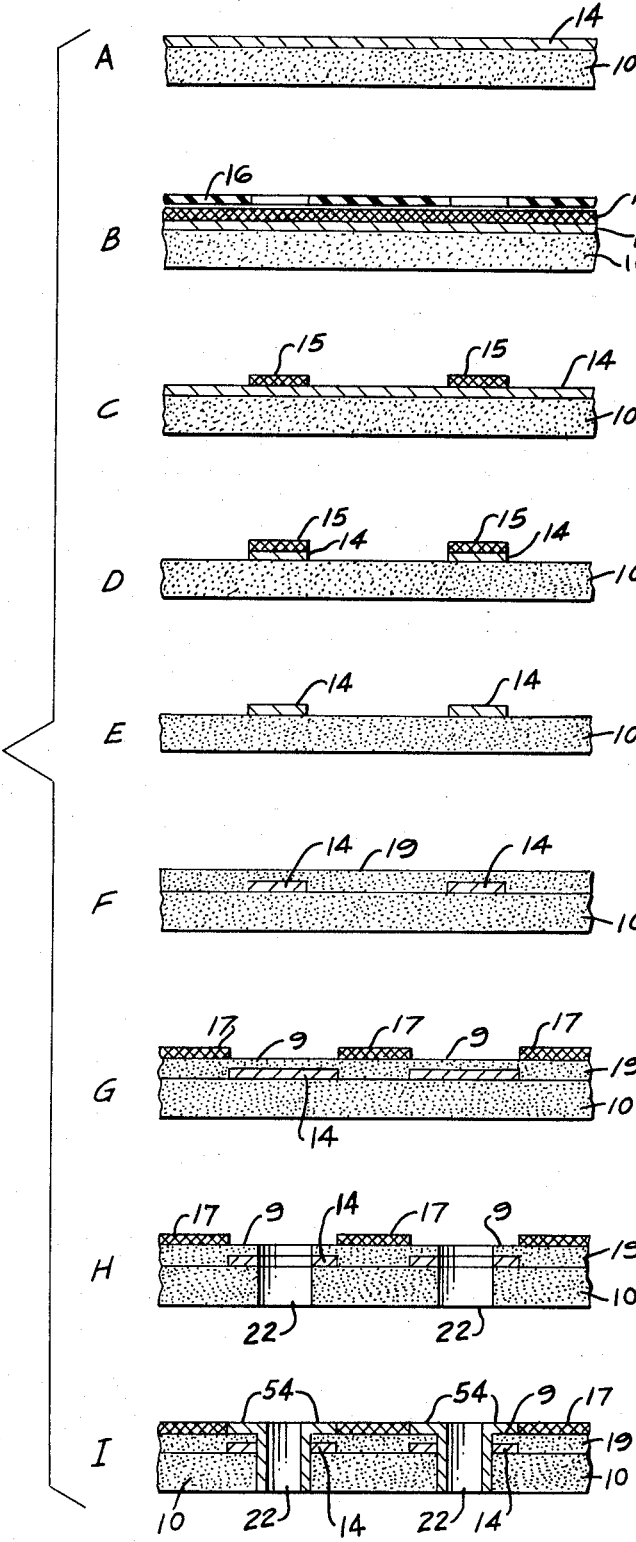

At A in FIG. 18 there is shown a metal clad laminate having an insulating catalytic core or base 10 covered by a thin metal foil 14.

At B the laminate is printed by means of a step and repeat negative 16 with an acid resist material 15.

The appearance of the laminate following printing is shown at C. Following printing, the foil not protected by the acid resist 15 is etched, to form a conductor pattern 14–15 shown in FIG. 18D. Following etching, the resist 15 is removed to leave a first conductive pattern of metal foil 14 adhered to base 10 as shown in FIG. 18E. In FIG. 18F, a layer of catalytic insulating resin 19 is superimposed on the base 10 and circuit pattern 14. As shown in FIG. 18G, a negative mask 17 is next printed on the catalytic ink 19 to leave exposed a positive pattern 9 of a second printed circuit. Next, holes 22 are provided in the panel at interconnecting points, as shown in FIG. 18H. Finally, the panel is immersed in an eletcroless metal deposition solution to deposit electroless metal 24 on the walls surrounding the holes 22 and on the exposed pattern 9 of catalytic ink 19 to form a second circuit pattern 54. The resin mask 17 may be a permanent mask or may be removed following electroless metal deposition. The printed pattern may be formed on the metal clad blanks of this invention in a variety of ways.

In the so-called photographic technique, the surface is cleaned and degreased, and a light sensitive enamel is uniformly spread over the metal foil and dried.

The photographic system of printing could also be used to produce the mask in the additive process for producing a circuit pattern by eletcroless metal deposition techniques described hereinabove. Whenever required, the light sensitive enamel could be made catalytic to the reception of electroless metal by dissolving or dispersing therein an agent which is catalytic to the reception of electroless metal.

For long production runs, the photographic system of printing tends to be slow and expensive, and as a result, etch resist printing will ordinarily be carried out either by offset printing on an offset printing press or by screen stencil printing on a manual or automatically operative screen printing press. The step and repeat negative is used to produce, in the case of an offset printing press, an offset printing plate. Acid resist ink is transferred by a rubber covered roll from the printing plate to the metal clad base.

In screen printing, the step and repeat negative is used to produce a stencil on the silk or wire mesh of the screen frame. The stencil is made photographically from the negative and reproduces it exactly.

Regardless of the type of printing employed, it will be understood that either a positive or a negative image of the desired conducting patterns may be imposed on the base, with suitable modifications to insure that the final conductive pattern desired is ultimately obtained.

When offset or screen stencil printing is employed, the ink used in printing is acid resistant, so that the portions of the metal foil recovered thereby are not affected by the etching solution when the plate is contacted therewith. Such acid resistant inks are well understood in the art, and commonly comprise resins such as cellulose acetate, cellulose butyrate, casein-formaldehyde, styrene-maleic anhydride, and the like. Such materials are acid resistant but can be readily removed when desired by readily available solvents or otherwise.

One etching solution commonly used with copper clad stock is ferric chloride. The etching opertion is carried out by either blasting the surface of the panel with a fine spray of ferric chloride or immersing the printed sheets, which are held in a rack or on a conveyor, in an agitated tank of ferric chloride. The etching operation is controlled by the concentration of the etching solution and time of contact, and these variables must be carefully controlled empirically for good results. After etching, a water rinsing process is employed to remove all etching chemicals, thereby preventing contamination of the surface or edges of the panel.

Frequently, a bare copper foil circuit is not adequate. If, for example, the circuit pattern is to be used as a switch, slip ring, or commutator, it may be necessary to plate the circuit pattern with silver, nickel, rhodium, gold and similar highly wear resistant metals. Where it is necessary to solder lugs or other hardware to the pattern, it may be advisable to have the conductor pattern solder plated.

Figure 19:
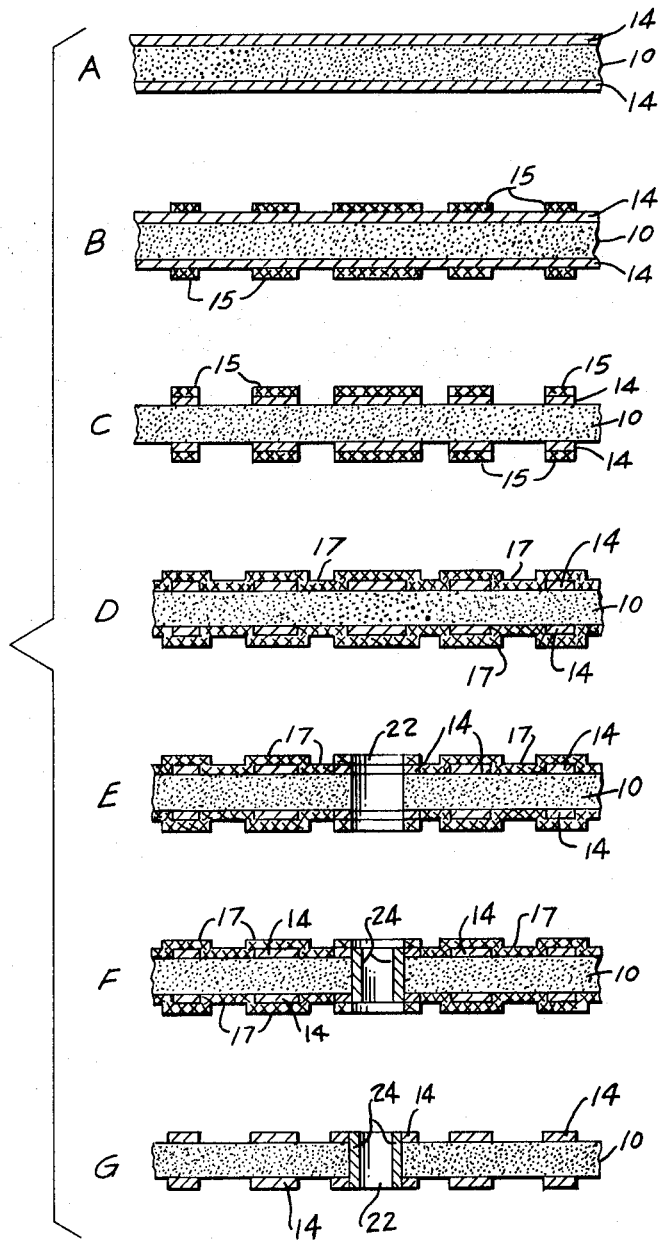

The steps in an alternative process for making two-sided plated through hole printed circuit boards using the metal clad insulating catalytic bases of this invention are described schematically in FIG. 19.

In FIG. 19A is shown a blank comprising a catalytic base 10 clad on both surfaces with metal foil 14. In FIG. 19B, a positive pattern of the desired circuit is made on the surface of the blank by printing a positive pattern of the desired circuit on each surface with an etch resistant ink 15. In FIG. 19C, the metal on both surfaces in the area not covered by the mask has been etched to remove the metal foil. In FIG. 19D, the etch resist 15 has been removed and the panel has been coated on both surfaces with an insulating, non-catalytic mask coating 17. Holes or apertures 22 are then made in the panel as shown in FIG. 19E. Any suitable procedure such as punching, drilling, etching, and the like, may be used to make the holes 22. The panel is then subjected to electroless deposition for a suitable period of time to form an adherent deposit of electroless metal 24 on the lateral walls of holes 22 to thereby connect the circuit patterns on both sides of catalytic base 10, the finished circuit appearing as shown in FIG. 19F. If desired, the mask 17 may be removed to form, as the finished circuit, the two-sided plated through board shown in FIG. 19G.

Figure 24:
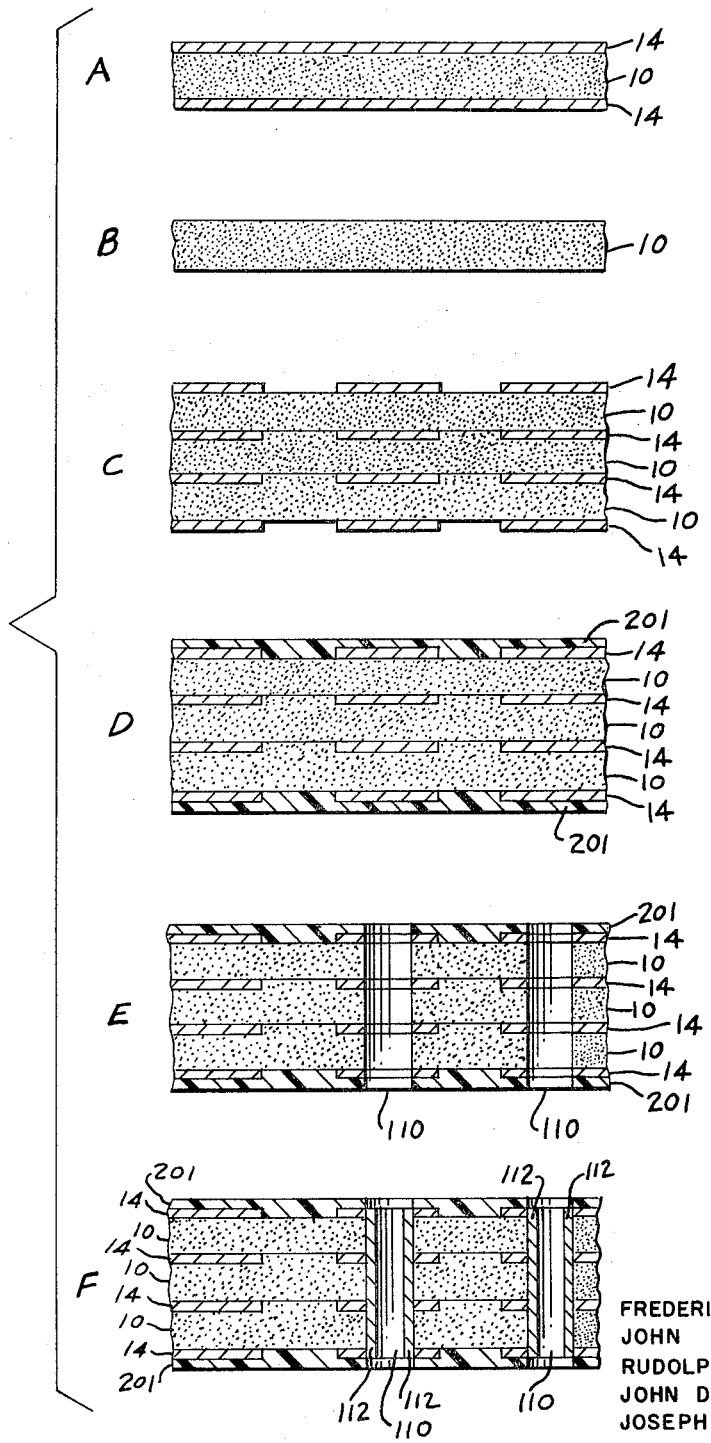

FIG. 24 illustrates the steps to be followed utilizing the FIG. 19 procedure to make a four-layered board from the blanks shown in FIG. 24A and FIG. 24B. In FIG. 24, reference numeral 10 in a catalytic insulating base 14 is a thin film of metal adhered to said base, 201 is an insulating, non-catalytic resinous mask, 110 is a hole, and 112 is a deposit of electroless metal connecting the walls of holes 110.

Another embodiment of the present invention is described schematically in FIG. 20.

In FIG. 20A is shown a blank comprising a catalytic base 10 clad on both surfaces with metal foil 14 and provided with apertures or holes 22 at pre-selected points. In FIG. 20B the metal clad stock containing apertures 22 is exposed to an electroless metal deposition solution to form a thin, uniform deposit of electroless metal 25 on the foil 14 and on the lateral wall 24 surrounding the hole. In FIG. 20C, the blank has been printed with an etch resist pattern 36 using the photographic technique described hereinabove. The etch resist 36, it will be noted, extends through the holes 22 and protects the electroless metal deposit in the holes. In FIG. 20D, the blank has been etched to form the circuit pattern with plated through holes. In FIG. 20E, the etch resist pattern 36 has been removed to form the completed circuit. In the embodiment of FIG. 20, after the walls 24 of holes 22 have been formed by electroless deposition, the thickness of the circuit pattern and the plated through hole could be built up by standard electrolytic techniques, if desired. For example, a negative mask could be imposed on the surface of the blank following the electroless deposition of step B, and the blank subjected to electrolytic deposition to build up the circuit pattern.

A further method of forming two-sided plated through hole printed circuit boards is shown schematically in FIG. 21.

In FIG. 21A is shown a blank comprising a catalytic base 10 clad on both sides with metal foil 14. The catalytic base 10 has been prepared or suitably treated to insure that its upper and lower surfaces are not catalytic to the reception of electroless metal. If desired, a blank of the type described in FIG. 12, metal clad on both surfaces could be used as the base 10 in the FIG. 21 embodiment. The blank is printed with a positive pattern of etch resist 36 as shown in FIG. 21B. Following printing, the plate is etched to leave the conductive portions of the pattern intact, the remaining portion of the foil having been etched away as shown in FIG. 21C. The etch rsist 36 is then removed so that the panel looks as shown at D in FIG. 21. Following removal of the etch resist, the panel is immersed in the electroless plating bath to deposit a uniform deposit of electroless copper 38 on the foil 14 and on the walls surrounding the holes as shown in FIG. 21E.

Figure 22:
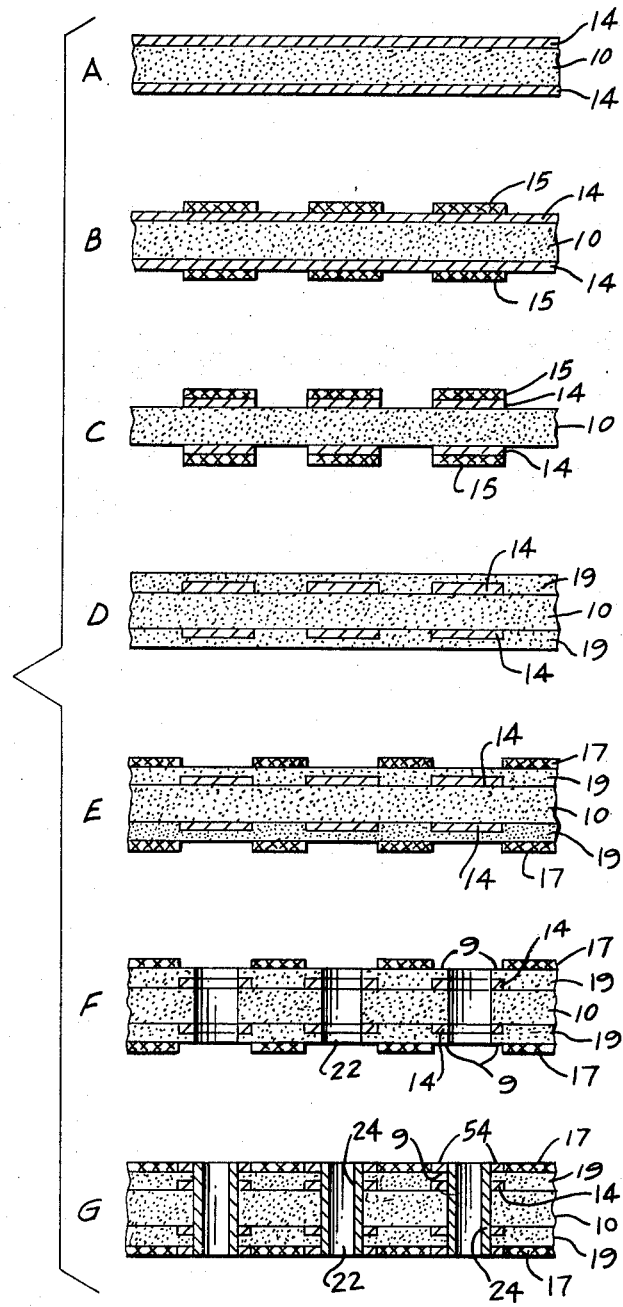

In FIG. 22 is depicted schematically the sequence of steps in the formation of a four-layered plated through hole board utilizing the procedure of FIG. 18 as described above. Since the reference numerals of FIG. 22 are identical to those of FIG. 18 and since the procedure of FIG. 22 is identical to that of FIG. 18, the procedure used in FIG. 22 is self-explanatory.

Figure 23:
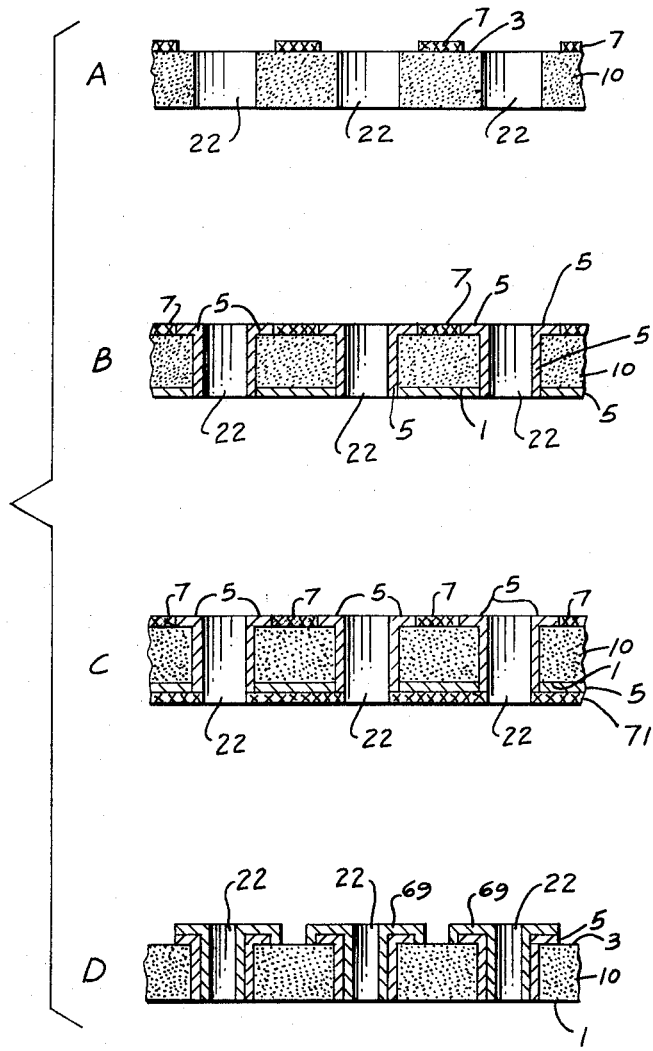

In FIG. 23 is shown still another embodiment of making plated through hole printed circuit boards using blanks of the type described. In FIG. 23A is shown a blank comprising a catalytic base 10 provided with holes 22. A negative pattern of the desired printed circuit is printed on the base 10 with an insulating ink. Negative mask 7 is non-catalytic. The blank is then subjected to electroless metal deposition to deposit a thin film of electroless metal 5 on the portion of the upper surface of the base not covered by the mask 7, on the walls surrounding the holes, and on the lower surface 1 of the base 10.

Lower surface 1 of the base 10 is then masked with a resist 71 as shown in FIG. 23C and the blank then connected as an electrode in an electrolytic metal deposition solution to build up the circuit pattern 5 electrolytically as shown at 69 (FIG. 23D). Alternatively, the pattern could be built up by electroless metal deposition. Following build-up of the circuit pattern, including the walls of the holes, the masks 71 and 7 are stripped from the blank and the blank subjected to a mild etch to remove the thin film of electroless metal 5 remaining on the lower surface 1. The finished circuit board following stripping is shown in FIG. 23D.

Figure 25:
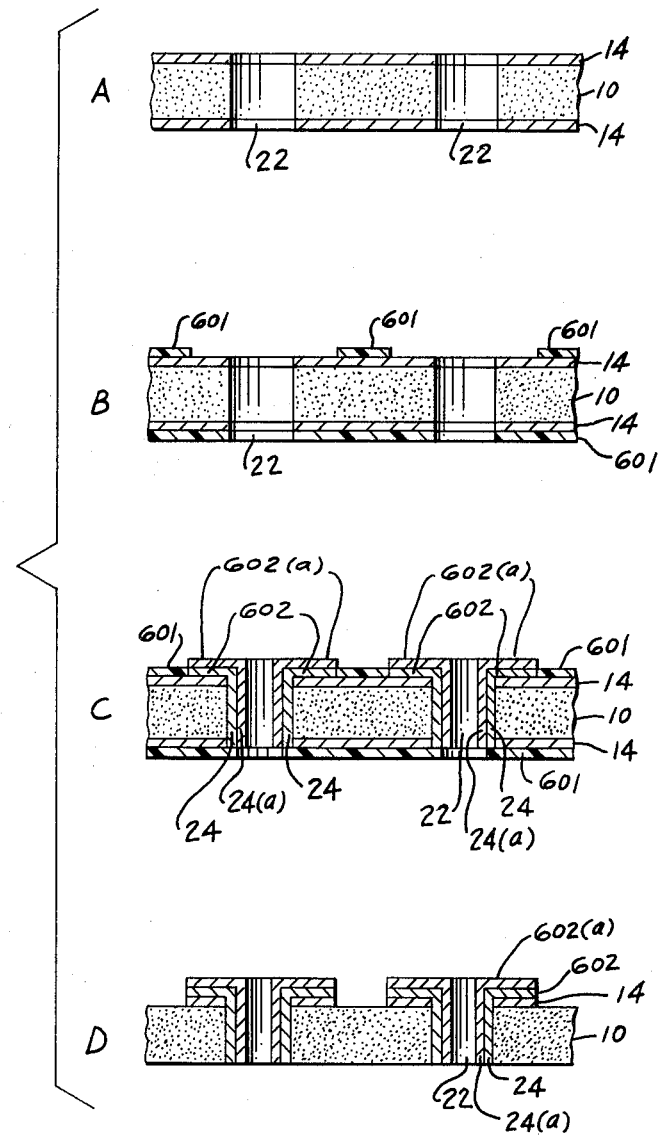

In FIG. 25 is shown a schematic illustration of the steps which could be used to produce printed circuits following a modified embodiment of the FIG. 23 procedure. In FIG. 25A is shown a blank which consists of a catalytic base 10 clad on both surfaces with a thin, e.g., less than 1 micron, metal film 14. Holes 22 are provided in the blank at pre-selected cross-over points. In FIG. 25B the blank has been coated on its lower surface with a non-catalytic resinous mask 601. A negative image of the desired circuit pattern has also been printed on the top surface of the blank as shown at 601. The next step in the procedure is to expose the blank to an electroless metal solution, thereby depositing electroless metal 24 on the walls surrounding the holes and also on the areas of the upper metal film 14 not covered by the mask 601, thereby imposing a circuit pattern 602 on the top surface of the blank. Next, if desired, the blank could be hooked up as an electrode in an electrolytic metal deposition solution to deposit additional metal 24A on the walls surrounding the holes and also to build up the circuit pattern 602 as shown at 602A. When the circuit pattern and the walls have been built up to the desired thickness, the blank is subjected to a suitable solvent to remove mask 601. Next, the blank is subjected to a suitable etchant to remove the thin layer of metal 14 on the lower surface of catalytic base 10, and on the upper surface of base 10 in the areas previously covered by mask 601. Following etching the completed circuit will have the appearance indicated in FIG. 25D.

Printed circuit boards depicted in FIG. 11A could be made from the blank of FIG. 11. Thus, a negative mask of the circuit could be superimposed on the upper surface 41 of the catalytic base 10 shown in FIG. 11. Holes defining cross-overs, if desired, could be made in the base 10. The entire blank would then be exposed to an electroless metal deposition solution to deposit electroless metal on the area of surface 41 not covered by the mask and on the lateral walls of the holes, following which the mask would be removed. The finished circuit board is depicted in FIG. 11A, wherein 51 represents the printed circuit pattern which includes holes 22 with plated walls 24. The board has an insulating, non-catalytic base 11.

The blank of FIG. 12 could be used to make plated through hole boards of the type shown in FIG. 12B. The top and bottom surfaces 11 of the circuit of FIG. 12B are non-catalytic, as brought out hereinabove. The circuit of FIG. 12B is made by providing holes 22 in the blank of FIG. 12 and then subjecting the blank to an electroless metal deposition solution to plate the walls 24 of holes 22. The blank of FIG. 12 could be provided with a network of holes arranged in a random pattern or in predetermined relationship or in a grid-pattern, as shown in FIG. 12C. When exposed to electroless metal solution, the walls of the holes 22 forming the grid in FIG. 12C would be plated as shown at 24 in FIG. 12B. The FIG. 12C embodiment could thus be used to produce in a simple manner a plated through hole bread-board base for mounting electrical components and a wide variety of other uses in various industries, e.g., the electronic industry. The holes in the embodiment of FIG. 12C could have the same or different diameters and be regularly or irregularly spaced.

The printed circuit board shown in FIG. 15B may be readily made from the blank of FIG. 15 using the additive process described above in connection with FIG. 12B. The circuit board of FIG. 15B comprises a catalytic base 10 coated with a catalytic resin 18 on which is superimposed a circuit pattern 51 having holes 22 with plated walls 24. The lower surface of the base 10 comprises a non-catalytic surface 11.

FIG. 16B represents a circuit board formed by the additive electroless metal deposition process heretofore described from the blank of FIG. 16. Similarly, FIG. 17B represents a two-sided plated through hole board produced by the additive electroless metal deposition process heretofore described from the blank of FIG. 17.

FIG. 14B represents a circuit board formed from the blank of FIG. 14. It comprises a catalytic base 10 having a lower insulating, non-catalytic surface 11. The upper surface comprises a catalytic adhesive resinous ink 18 on which is superimposed a conductor pattern comprising metal foil 14 and electroless metal deposit 801. The circuit also contains holes 22 with plated walls 24.

The catalytic bases and catalytic inks referred to herein are compositions which comprise an agent which is catalytic to the reception of electroless metal.

The catalytic agent may be a metal of Groups VIII and I-B of the Periodic Table of Elements, such as nickel, gold, silver, platinum, palladium, rhodium, copper and iridium. Compounds of such metals, including salts and oxides thereof, may also be used.

In making the catalytic base 10, a variety of techniques may be utilized. Thus, a resin having dispersed therein or dissolved therein or reacted or complexed therewith a catalytic agent could be used to impregnate laminates, such as paper, wood, Fiberglas, polyester fibers and other porous materials. These base materials, for example, could be immersed in the catalytic resin or the catalytic resin could be sprayed onto the base material, after which the base materials could be dried in an oven until all the solvent has evaporated, leaving a laminate of the type described impregnated with the catalytic resin. If desired, the laminates could be bonded together to form a base of any desired thickness.

Alternatively, the catalytic agent could be dissolved in or dispersed in or reacted with or complexed with a resinous material, which in turn could be molded into a base of the desired size, as by molding.

A further alternative would be to preform or premold thin films or strips of unpolymerized resin having dissolved in or dispersed in or reacted with or complexed with a catalytic agent, and then laminate a plurality of the strips together to form a catalytic insulating base of the desired thickness. In any event, it will be appreciated that the interior of the insulating base will be catalytic throughout, such that, when holes or apertures are formed therein at any part, the walls of the holes or apertures will be sensitive to the reception of electroless metal from an electroless metal chemical deposition solution such as an electroless copper solution.

As brought out hereinabove, the surface of the insulating catalytic base may or may not be catalytic, depending upon how it is made. The surface could be made catalytic by mechanical means, as by mild abrasion, e.g., by sand blasting, or by chemical means, as by treatment with chemical solvents, etchants, milling solutions, and the like. As brought out above, a preferred chemical treatment for rendering the surface catalytic and improving bond is to treat the surface with acids, preferably oxidizing acids, e.g., sulfuric, nitric, chromic and the like. Alternatively, the exposed surface or surfaces of the catalytic bases could be made catalytic by coating them with a thin film of the catalytic adhesives or inks of the type described herein.

In making catalytic bases of the type described, wherein the catalytic agent is dissolved in the resin, it is helpful if the catalytic agent is initially dissolved in a suitable solvent prior to incorporation into the resin. The solvent may then be evaporated during curing of the resin.

In a further embodiment, a solution of the catalytic agent could be used to treat an adsorbent filler to thereby impregnate the filler with a catalytic agent. The catalytic agent suitably impregnated could then be incorporated into the resin base. Typical fillers are those ordinarily used in the resins and plastics. As examples may be mentioned aluminum silicate, silica gel, clay, such as kaolin, attapulgite, and the like.

Catalytic agents of the type described could also be incorporated into a resin during its manufacture in the form, for example, of a molding powder. The molding powder could then be extruded or otherwise worked to form a plastic article which would be catalytic.

The catalytic insulating base need not be organic. Thus, it could be made of inorganic insulating materials, e.g., inorganic clays and minerals such as ceramic, ferrite, carborundum, glass, glass bonded mica, steatite and the like. Here, the catalytic agent would be added to inorganic clays or minerals prior to firing.

The term "catalytic" as used herein refers to an agent or material which is catalytic to the reduction of the metal cations dissolved in electroless metal deposition solutions of the type to be described. The amount of catalytic agent used in the bases and adhesive resins described will vary depending upon the agent and the form in which it is used from about 0.001 to 80%, usually between about 0.1 to 10%, based upon the combined weight of base material or adhesive resin and catalyst.

Among the organic materials which may be used to form the catalytic insulating bases and adhesives described herein may be mentioned thermosetting resins, thermoplastic resins and mixtures of the foregoing.

Among the thermoplastic resins may be mentioned the acetal resins; acrylics, such as methyl acrylate; cellulosic resins, such as ethyl cellulose, cellulose acetate, cellulose propionate, cellulose acetate butyrate, cellulose nitrate, and the like; chlorinated polyethers; nylon; polyethylene; polypropylene; polystyrene; styrene blends, such as acrylonitrile styrene co-polymer and acrylonitrile-butadiene-styrene co-polymers; polycarbonates; polychlorotrifluoroethylene; and vinyl polymers and co-polymers, such as vinyl acetate, vinyl alcohol, vinyl butyral, vinyl chloride, vinyl chloride-acetate co-polymer, vinylidene chloride and vinyl formal.

Among the thermosetting resins may be mentioned allyl phthalate; furane; melamine-formaldehyde; phenol formaldehyde and phenol-furfural co-polymer, alone or compounded with butadiene acrylonitrile co-polymer or acrylonitrile-butadiene-styrene copolymers; polyacrylic esters; silicones; urea formaldehydes; epoxy resins; allyl resins; glyceryl phthalates; polyesters; and the like.

For the manufacture of printed circuits, the catalytic adhesive will ordinarily comprise a flexible adhesive resin, alone or in combination with thermosetting resins of the type described. Typical of the flexible adhesive resins which may be used in such a system are the flexible adhesive epoxy resins, polyvinyl acetal resins, polyvinyl alcohol, polyvinyl acetate, and the like. Preferred for use as the adhesive resin are natural and synthetic rubber, such as chlorinated rubber, butadiene acrylonitrile co-polymers, and acrylic polymers and co-polymers.

The adhesive resins of the type described have appended thereto polar groups, such as nitrile, epoxide, acetal and hydroxyl groups. Such adhesive resins co-polymerize with and plasticize any thermosetting resins which may be present in the system, and alone or in combination with the thermosetting resins impart good adhesive characteristics through the action of the polar groups.

The catalytic adhesives will comprise an adhesive resin of the type described having dissolved therein, or dispersed therein, or chemically reacted therewith or complexed therewith, one or more of the catalytic agents of the type described hereinabove.

When present in an adhesive resin of the type described, regardless of the manner in which it is incorporated, the catalytic agent, depending upon type, will be present in amounts varying from a small fraction, e.g., 0.001 to about 80%, based upon the combined weight of adhesive resinous material and catalyst. The particular concentration used will depend to a large extent upon the materials used.

Typical formulations for catalytic insulating adhesives or inks and catalytic insulating bases suitable for use herein are given in co-pending application Ser. No. 218,656, which is in turn a continuation-in-part of U.S. Pat. 3,226,256, and also in Ser. No. 390,624, the disclosures of which applications and patents are herein incorporated by reference.

As described in the applications and patent referred to in the preceding paragraph, preferred catalytic compounds for dissolution in, dispersion, chemical reaction with, or complexing with resins of the type described are the metals of Groups I-B and VIII of the Periodic Table of Elements, or salts or oxides thereof, such as chlorides, bromides, fluorides, ethyl acetoacetates, fluoroborates, iodides, nitrates, sulfates, acetates, and oxides of such metals. Especially useful are palladium, gold, platinum, copper, palladium chloride, gold chloride, platinum chloride, copper oxide and stannous chloride.

As has been brought out hereinabove, the catalytic bases or adhesives of this invention may contain one or more resins, or a mixture of one or more solvents with one or more resins. The amount of catalytic compound dissolved in the resin will usually vary from about 0.001 to 25% by weight, or even more where appropriate. Preferably, the concentration of the catalytic compound will be below 10% by weight.

Typical examples of the catalytic bases and adhesives for use herein are given below:

EXAMPLE 1

Butyrolactone _____ grams__ 60
Palladium chloride _____ gram__ 0.1
Concentrated (37%) hydrochloric acid _____ drops__ 5

The composition of this example was added to a photoresist and an insulating substratum was coated with the resulting photoresist. The photoresist was then photo printed, and following development, the substratum was immersed in an electroless copper deposition solution of the type described in Examples 6–9. Good electroless copper deposition was obtained on the printed circuit pattern formed by the catalytically active photoresist.

EXAMPLE 2

N-methyl-2-pyrrolidone _____ grams__ 50
Palladium chloride _____ gram__ 0.5
Diacetone alcohol _____ milliliters__ 450

Prolonged agitation was required to assure complete solution of the palladium chloride. The resulting solution was added to a variety of thermoplastic and thermosetting base materials and also used to impregnate glass cloth. Following evaporation of the solvent, the resulting bases were found to be catalytic to the reception of electroless metal.

Other preferred embodiments of catalytic solutions which can be added to resins to produce catalyst bases include:

TABLE

Palladium chloride in tetrahydrofuran
Palladium chloride in dimethyl sulfoxide
Palladium chloride in dimethyl sulfoxide and methylene chloride
Palladium chloride in dimethyl formamide
Palladium chloride in Cellosolve acetate
Palladium chloride in methyl ethyl ketone
Palladium chloride in xylene
Palladium chloride in acetic acid
Palladium chloride in tetrahydrofurfuryl alcohol
Palladium chloride in methylene chloride
Gold chloride in ethyl alcohol
Chloroplatinate in ethyl alcohol Of the catalyst solutions listed in the table, particularly stable for long periods of time is a solution of 10% palladium chloride in a mixture of dimethyl sulfoxide and methylene chloride.

As will be clear from the foregoing, the catalyst solutions of the type described in Examples 1 and 2 and in the table, in addition to being highly useful for addition to thermosetting or thermoplastic resins containing systems to catalyze the same, are also suitable for impregnating coating materials, such as photoresists, paper, glass cloth laminates and the like, to render such compositions catalytic. These catalytic solutions may also, for example, be used in combination with solid catalytic agents to make plastics of the type described catalytic, and to make such systems more responsive to electroless metal deposition.

The catalytic insulating adhesives of this invention comprise a flexible adhesive resinous binder of the type described to insure good bond strength between the electroless metal deposit and the substrate. In use of such systems, the substrate need only be immersed in or sprayed with the catalytic adhesives, following which the solvent may be evaporated as by heating, to deposit on the substrate a flexible adhesive resin containing therein the catalytic agent. Typical systems of this type are described in Examples 3 to 5.

EXAMPLE 3

A catalytic adhesive was prepared according to the following formulation:

Grams/liter
Ethylene glycol monoethyl ether acetate (Cellosolve acetate) _____ 600
Epoxy resin (ERL 2256) _____ 109
Acrylonitrile butadiene copolymer rubber (Hycar 1312) _____ 20
Phenolic resin (SP 103) _____ 20
Phenolic resin (SP 126) _____ 20
Phenolic resin (SP 6600) _____ 20
Acrylonitrile-butadiene (Paracil CV) _____ 144
Silicon dioxide (Cab-O-Sil) _____ 50
Wetting agent (Igepal 430) _____ 17.5

Separate solutions of the following salts were prepared by dissolving the salts in 50 grams N-methyl-2-pyrrolidone at room temperature:

Palladium chloride
Cupric chloride
Silver nitrate
Auric chloride.

The resulting solutions were mixed with an equal part by weight of the adhesive binder. Each of the resulting adhesive resin systems was successfully used to catalyze a wide variety of plastic substrata for the electroless deposition of copper, using copper bath of the type described in Example 7.

EXAMPLE 4

| | Grams |
|---|---|
| N-methyl-2-pyrrolidone | 50 |
| Auric chloride | 1.67 |
| Adhesive 10 | 300 |

EXAMPLE 5

| | Grams |
|---|---|
| N-methyl-2-pyrrolidone | 50 |
| Palladium chloride | 1 |
| Stannous chloride | 1.13 |
| Adhesive 10 | 300 |

EXAMPLE 6

| | Grams |
|---|---|
| N-methyl-2-pyrrolidone | 40 |
| Auric chloride | 1.67 |
| Stannous chloride | 1.13 |
| Adhesive 10 | 300 |

In Examples 4, 5 and 6, the ingredient designated as Adhesive 10 corresponds to the following clear adhesive system:

| | Grams |
|---|---|
| Methylethyl ketone | 1200 |
| Acrylonitrile-butadiene (Paracil CV) | 72 |
| Phenolic resin (SP 8014) | 14 |

The solutions of Examples 4, 5 and 6 were used as a catalytic adhesive for dip coating thermoplastics. The coated plastics, when immersed in electroless copper deposition solutions of the type described in Examples 7 to 10 rapidly and successfully initiated electroless copper deposition at all coated surface areas.

The addition of the stannous chloride in Examples 4, 5 and 6 appeared to render the systems more active and more responsive time-wise to the action of the electroless copper baths.

In the catalytic base embodiment of the invention, the system will comprise one or more of the resins described, having dissolved in, dispersed in, reacted with or complexed with, the catalytic agent with no auxiliary solvent.

As already indicated, catalytic adhesive may also be used as an ink to paint the surface areas on which electroless metal is deposited.

The catalytic adhesives could also be printed, as by silk screen printing, on an insulating support and cured thereon.

A particularly important embodiment of the catalytic insulating base is prepared by dissolving or dispersing the catalytic agent in an insulating base which may in turn be formed into a three-dimensional object, as by molding. In this embodiment, the entire composition is catalytic, so that holes or apertures could be formed in the three-dimensional object. When such an article, containing apertures extending below the surface thereof, is subjected to an electroless metal deposition solution, electroless metal deposits practically instantaneously on the walls surrounding the apertures. As has been brought out, this embodiment is especially suitable for making printed circuit patterns having plated through holes, i.e., holes having surrounding walls which are plated with metal to form through connections between two surfaces of the insulating catalytic base.

Typically, the autocatalytic or electroless metal deposition solutions for use with the catalytic insulating bases and adhesives described comprise an aqueous solution of a water soluble salt of the metal or metals to be deposited, a reducing agent for the metal cations, and a complexing or sequestering agent for the metal cations. The function of the complexing or sequestering agent is to form a water soluble complex with the dissolved metallic cations so as to maintain the metal in solution. The function of the reducing agent is to reduce the metal cation to metal at the appropriate time, as will be made more clear hereinbelow.

Typical of such solutions are electroless copper, electroless nickel and electroless gold solutions. Such solutions are well known in the art and are capable of autocatalytically depositing the identified metals without the use of electricity.

Typical of the electroless copper solutions which may be used are those described in U.S. Patent 3,095,309, the description of which is incorporated herein by reference. Conventionally, such solutions comprise a source of cupric ions, e.g., copper sulfate, a reducing agent for cupric ions, e.g., formaldehyde, a complexing agent for cupric ions, e.g., tetrasodium ethylenediaminetetraacetic acid, and a pH adjustor, e.g., sodium hydroxide.

Typical electroless nickel baths which may be used are described in Brenner, "Metal Finishing," November 1954, pages 68 to 76, incorporated herein by reference. They comprise aqueous solutions of a nickel salt, such as nickel chloride; an active chemical reducing agent for the nickel salt, such as the hypophosphite ion; and a complexing agent, such as carboxylic acids and salts thereof.

Electroless gold plating baths which may be used are disclosed in U.S. 2,976,181, hereby incorporated herein by reference. They contain a slightly water soluble gold salt, such as gold cyanide, a reducing agent for the gold salt, such as the hypophosphite ion, and a chelating or complexing agent, such as sodium or potassium cyanide. The hypophosphite ion may be introduced in the form of the acid and salts thereof, such as the sodium, calcium and the ammonium salts. The purpose of the complexing agent is to maintain a relatively small portion of the gold in solution as a water soluble gold complex, permitting a relatively large portion of the gold to remain out of solution as a gold reserve. The pH of the bath will be about 13.5, or between about 13 and 15, and the ion ratio of hypophosphite radical to insoluble gold salt may be between about 0.33 and 10 to 1.

Specific examples of electroless copper depositing baths suitable for use will now be described:

EXAMPLE 7

| | Moles/liter |
|---|---|
| Copper sulfate | 0.03 |
| Sodium hydroxide | 0.125 |
| Sodium cyanide | 0.0004 |
| Formaldehyde | 0.08 |
| Tetrasodium ethylenediaminetetraacetate | 0.036 |
| Water, remainder | |

This bath is preferably operated at a temperature of about 55° C. and will deposit a coating of ductile electroless copper about 1 mil. thick in about 51 hours.

Other examples of suitable baths are as follows:

EXAMPLE 8

| | Moles/liter |
|---|---|
| Copper sulfate | 0.02 |
| Sodium hydroxide | 0.05 |
| Sodium cyanide | 0.0002 |
| Trisodium N-hydroxyethylethylenediaminetriacetate | 0.032 |
| Formaldehyde | 0.08 |
| Water, remainder. | |

This bath is preferably operated at a tempreature of about 56° C., and will deposit a coating of ductile electroless copper about 1 mil. thick in 21 hours.

EXAMPLE 9

| | Moles/liter |
|---|---|
| Copper sulfate | 0.05 |
| Diethylenetriamine pentaacetate | 0.05 |
| Sodium borohydride | 0.009 |
| Sodium cyanide | 0.008 |
| pH | 13 |
| Temperature °C | 25 |

EXAMPLE 10

|  | Moles/liter |
|---|---|
| Copper sulfate | 0.05 |
| N-hydroxyethylethylenediaminetriacetate | 0.115 |
| Sodium cyanide | 0.0016 |
| Sodium borohydride | 0.008 |
| pH | 13 |
| Temperature °C | 25 |

Utilizing the electroless metal baths of the type described, very thin conducting metal films may be laid down. Ordinarily the metal films superimposed by electroless metal deposition will range from 0.1 to 7 mils. in thickness, with metal films having a thickness of even less than 0.1 mil. being a distinct possibility.

Figure 26:
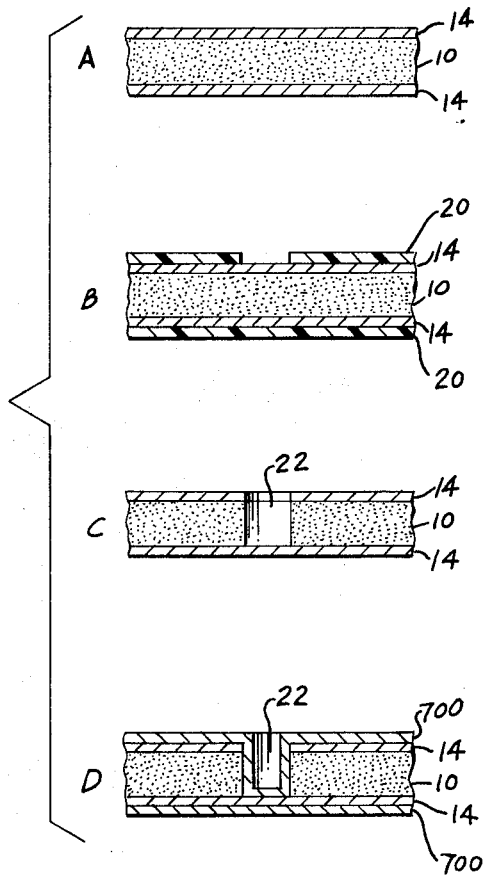
Figure 27:
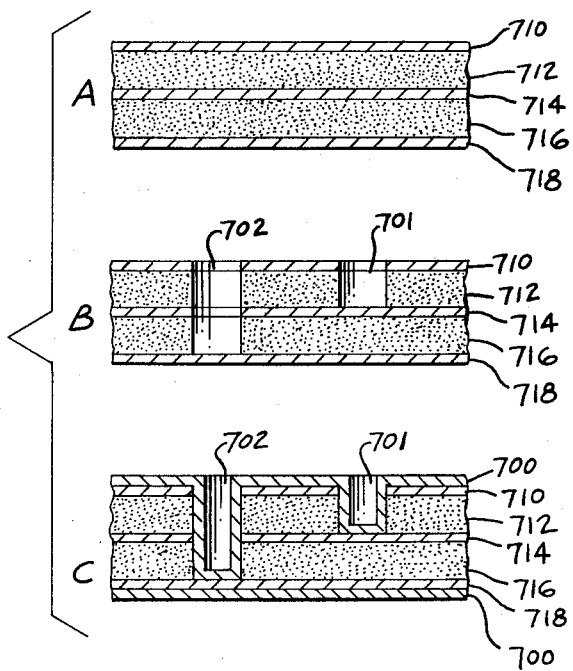

FIGS. 26 and 27 illustrate additional procedures for manufacturing printed circuits utilizing the catalytic bases described hereinabove. In FIG. 26A is illustrated a blank containing a catalytic base 10, each surface of which has adhered thereto a thin film of metal 14. In FIG. 26B, the top surface 14 is coated with a mask 20 to leave a hole pattern 801 exposed. The entire bottom surface 14 is also coated with a mask 20. Next, the hole pattern is etched to remove the metal foil in area 801. Holes 22 are then provided in the blank by standard etching techniques. Mask 20 is also removed. As shown in FIG. 26C, the hole 22 stops at the surface of the lower metal film 14. The resulting base is then subjected to an electroless metal deposition solution to deposit electroless metal 700 on the walls of hole 22 surrounded by the catalytic base 10 as well as the upper metal film 14. Electroless metal 700 will also deposit on the exposed surface of lower metal film 14. There is thus provided an electrical connection between the upper metal film 14 and the lower metal film 14 via the catalytic base 10. If desired, the walls of hole 22 could be built up by connecting the blank as an electrode in an electrolytic metal deposition solution. The blank shown at C containing plated through hole 22 could then have superimposed thereon on both the upper and lower surface a printed circuit pattern utilizing the print and etch techniques described hereinabove. In an alternative embodiment, print and etch circuit patterns could be imposed on the surfaces before subjecting the blank to electroless metal deposition.

In FIG. 27 is shown a modified procedure for producing multi-layer boards having through electrical connections between the layers. In FIG. 27A there is shown a blank containing metal films 710, 714 and 718 bonded to intermediate catalytic base material 712 and 716. In FIG. 27B holes 701 and 702 have been provided in the blank. Hole 701 extends through metal film 710. Hole 702 extends through metal film 710, catalytic base 712, metal film 714 and catalytic base 716 and stops at the upper surface of metal film 718. Next, the resulting blank is subjected to electroless metal deposition solution to deposit metal 700 on the exposed metal films 710 and 718 and on the walls surrounding the holes 701 and 702. The hole 701 thereby provides a through connection between the upper layer 710 and intermediate catalytic layer 714 of the base. Hole 702 provides an electrical connection between all three metal films, i.e., 710, 714 and 718. Using the print and etch techniques of the type described hereinabove, circuit patterns could be imposed on both the upper and lower exposed surfaces 700 of the blank to thereby provide a multi-layer board having through hole connections at pre-determined or predefined cross-over points. In preparing the multi-layer boards using the procedures described schematically in FIG. 27, the intermediate layer 714 could either be a continuous metal film, or, alternatively, be an intermediate printed circuit pattern. Obviously, in the FIG. 27 embodiment, as many layers as is required could be built up.

FIG. 28 illustrates still a further embodiment of the catalytic blanks of this invention. In FIG. 28, 801 is an insulating base which is catalytic to the reception of electroless metal. Surface layer 802 is however non-catalytic. The upper surface 803 of non-catalytic layer 802 is provided with a catalytic agent 804. If desired, the lower surface of blank 801 could also have a non-catalytic surface layer, the exposed surface of which could be provided with a catalytic agent. In making the blank of FIG. 28, a catalytic base 801 could be fabricated with one or both surfaces sealed as described hereinabove, such that the exposed surface layers were not catalytically active, or substantially catalytically inactive. The resulting blank could then be treated with an acid, e.g., sulfuric, chromic, or a mixture of chromic and sulfuric acid, to open up the exposed surface and thereby render it catalytic. If desired, the sealed surfaces of the blank could also be treated with conventional sensitizing-seeding solutions to render the surface catalytic. Thus, the sealed surface or surfaces could be treated with an acidic aqueous solution of stannous tin ions followed by an acidic aqueous solution of precious metal ions, e.g., palladium ions. Alternatively, the sealed surface or surfaces could be treated with an acidic aqueous solution comprising both stannous tin and precious metal ions. The sealed surfaces could also be rendered catalytic by the catalytic inks described herein. Combinations of the foregoing sensitizing-seeding treatments could also be used. Following sensitization, the surface or surfaces of the blank of FIG. 28 could be metallized by exposing the surface or a potrion thereof to an electroless metal deposition solution. Holes could also be provided in the blank and the walls thereof metallized by exposure to electroless metal solutions, as described hereinabove.

Another method for making printed circuits using the catalytic base of this invention is illustrated in FIG. 29. As shown in FIG. 29A, the starting blank comprises a catalytic base 900 having bonded thereto metal layers 902 and 904. Using a print and etch technique of the type described above, circuit 906 is imposed on the catalytic base 900. In FIG. 29C the circuit 906 is coated with solder mask 908 which may be permanent to leave exposed lands 907 defining interconnecting points between the circuits. In FIG. 29D holes 912 are provided in the lands 907. The circuit board as it looks in FIG. 29D is then exposed to an electroless metal deposition solution of the type described herein to deposit electroless metal 916 on the walls surrounding the holes and to deposit additional electroless metal 914 on the lands surrounding the holes as shown in FIG. 29E. In an alternative embodiment, the solder mask shown in FIG. 29D could cover the entire circuit pattern with the exception of the holes per se. When the resulting base is exposed to electroless metal, the walls of the holes would be plated but there would be no lands exposed. The embodiment of FIG. 29, including the alternatives suggested, represents an important commercial process for practicing the invention described herein.

The invention in its broader aspects is not limited to the specific steps, methods, compositions and improvements shown and described herein, but departures may be made within the scope of the accompanying claims without departing from the principles of the invention and without sacrificing its chief advantages.

What is claimed is:

1. A method for manufacturing printed circuit boards, comprising:

providing an insulating base which is catalytic to the reception of electroless metal and having adhered to a surface thereof a unitary electroless metal deposit layer having a thickness of less than about 5 microns;

masking selected portions of said metal layer to establish a unmasked conductor pattern;

depositing directly on said unmasked conductor pattern a second layer of metal forming a circuit conductor pattern;

removing the masking; and contacting the exposed first and second metal layers to an etchant for a time sufficient to remove those portions of the first layer surrounding the conductor pattern thereby to expose selected portions of said insulating base surface, but for a time insufficient to remove the circuit conductor pattern.

2. The method of claim 1, wherein:
the thickness of said electroless metal deposit layer is between about 2 microns and 4 microns.

3. The method of claim 1, wherein:
said insulating base is catalytic throughout its interior to the reception of electroless metal.

4. The method of claim 1, wherein:
said second layer is deposited by electroless deposition of said metal.

5. The method of claim 1, wherein:
said second layer is deposited by electroplating.

6. The method of claim 1, wherein:
said first and second metal layers are copper.

7. A printed circuit board, comprising:
an insulating base which is catalytic throughout its interior to the reception of electroless metal and having adhered to a surface thereof a unitary electroless metal deposit layer having a thickness of less than about 5 microns, an aperture extending through said layer into the interior of the base; and
a second layer adhered to the wall of the aperture and to at least selected portions of the first layer to form a circuit pattern conductor thereon, thereby to provide a printed circuit board blank suitable for etch removal of said first layer without total removal of the second layer.

8. The method of claim 1 wherein the first and second metal layers are of the same metal.

References Cited

UNITED STATES PATENTS

| | | |
|---|---|---|
| 2,690,401 | 9/1954 | Gutzeit et al. _____ 117—47 |
| 2,690,403 | 9/1954 | Gutzeit et al. |
| 2,947,064 | 8/1960 | Langton. |
| 3,031,344 | 4/1962 | Sher et al. |
| 3,171,756 | 3/1965 | Marshall. |
| 3,194,681 | 7/1965 | Nicholson et al. |
| 3,276,106 | 10/1966 | Bester et al. |
| 3,391,454 | 7/1968 | Reimann et al. |

OTHER REFERENCES

"Stromlos erzeugte Metalluberzuge" 1964, p. 34, Eugen C. Leuze Verlag, Saulgau, Wurttemberg, Germany.

WILLIAM L. JARVIS, Primary Examiner

U.S. Cl. X.R.

117—217, 5.5; 156—8, 13; 174—68.5; 204—38 B